(No Model.)
M. P. McDERMOTT.
BURGLAR ALARM.
No. 578,893. Patented Mar. 16, 1897.
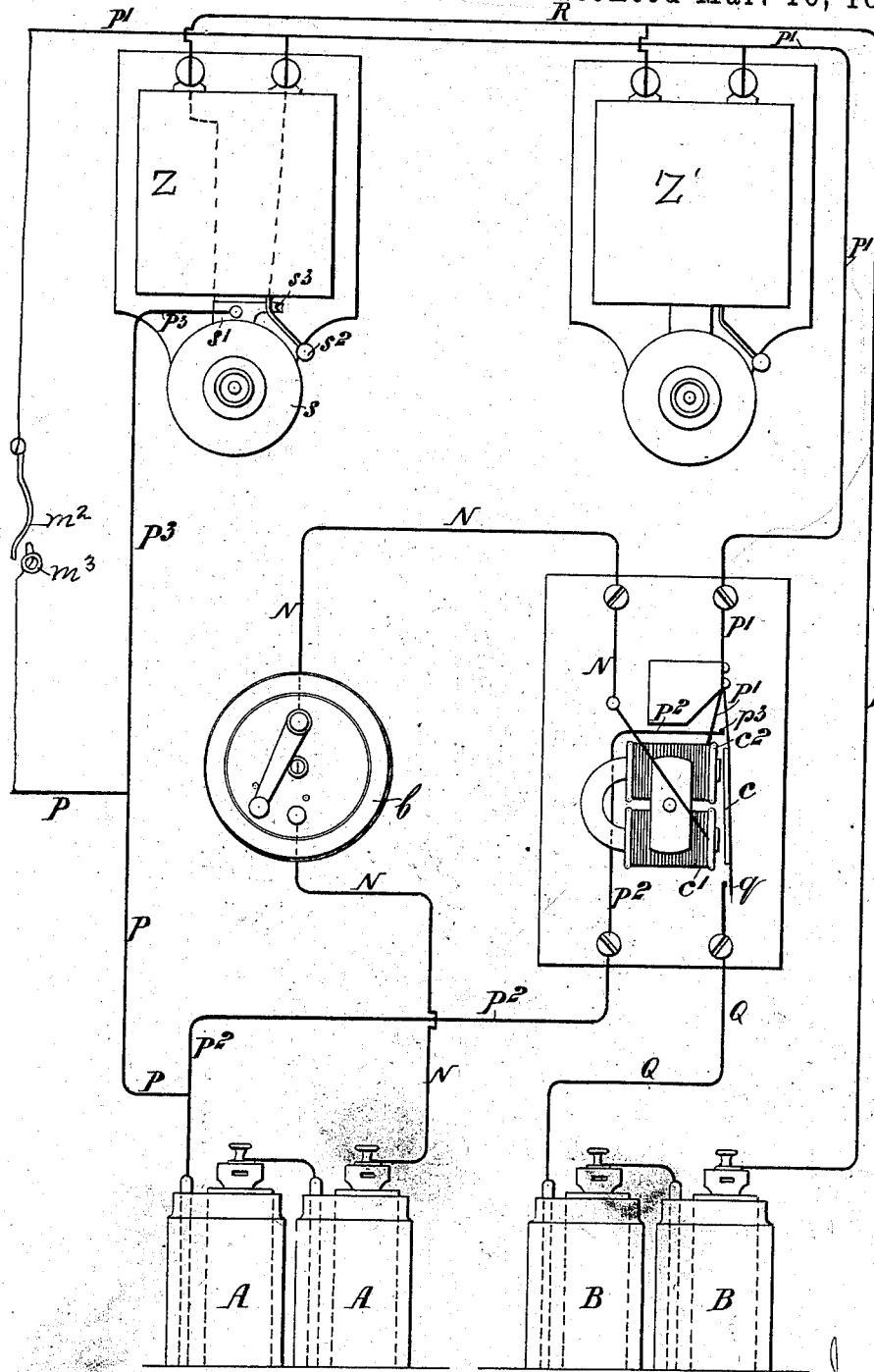
Witnesses
H. van Oldenneel
F. Ollendorf
Inventor
Martin Phillip McDermott
by Richardson
Attorneys

UNITED STATES PATENT OFFICE.

MARTIN PHILLIP McDERMOTT, OF AUCKLAND, NEW ZEALAND, ASSIGNOR OF ONE-HALF TO JOHN LOGAN CAMPBELL, OF SAME PLACE.

BURGLAR-ALARM.

SPECIFICATION forming part of Letters Patent No. 578,893, dated March 16, 1897.

Application filed August 7, 1896. Serial No. 602,064. (No model.) Patented in New Zealand December 3, 1895, No. 828, and in New South Wales February 3, 1896, No. 6,368.

*To all whom it may concern:*

Be it known that I, MARTIN PHILLIP MC-DERMOTT, a subject of the Queen of Great Britain, residing at Auckland, in the Colony of New Zealand, have invented an Improved Burglar-Alarm, (for which I have obtained patents in New Zealand, No. 828, dated December 3, 1895, and in New South Wales, No. 6,368, dated February 3, 1896,) of which the following is a specification.

My invention relates to burglar-alarms, whereby the tampering with doors, windows, safes, or other fittings of a building can be detected and signaled by the movement of the same completing an electric circuit and actuating a bell.

The accompanying drawing shows in diagram my invention.

A A are the cells of a battery, from the negative pole of which the wire N passes to a switch $b$ and thence to electromagnet C'. The positive pole of such battery has wire P attached thereto. When the switch $b$ is closed, the circuit will be closed when any of the contacts hereinafter mentioned are operated by an unauthorized person, the return-current passing through wire P' to electromagnet $c^2$. Upon the closing of the circuit of the cells A the armature $c$ will be drawn toward the magnet until it touches the points $p^3$ and $q$ of wires P² and Q, respectively. A current will now pass from cells B through wire Q, armature C, wire P' to bells Z Z', the return-current passing through wire R back to the battery B. The alarm-bells Z Z' will continue to ring until switch $b$ is operated to break the circuit.

$m^2$ $m^3$ are representative of any suitable contacts arranged in position in the circuit to be closed by the burglar or other person tampering with the part of the building or device contained therein which it is desired to protect against violation.

When the switch $b$ is closed and contacts $m^2$ and $m^3$ closed by the opening of the lock or tampering with a like part by an unauthorized person, the circuit may then be traced as follows: starting from the carbon pole of battery A along wire N to switch $b$, again along wire N through relay-coils, wire P' to contacts $m^2$ and $m^3$ along wire P back to the zinc pole of battery A. The armature $c$ of relay being attracted a continuous ringing of the alarm is established by a shunt from relay-armature $c$, contact $p^3$, wire P², back to zinc pole of battery A. After the magnet is thus energized by contacts being tampered with by an unauthorized person and armature $c$ thus attracted to the magnet contact is made at points $p^3$ and $q$, which then allows a current to pass from battery A through wire P² to the magnet, thus keeping the magnet continually magnetized and allowing current from battery B to pass through wire Q, through armature $c$, through wire P' to the bells. The other current to bells passes through wire R from battery B. The bell-circuit starts from the carbon pole of battery B, wire R, bells Z and Z', connected in multiple arc, wire P', relay-armature $c$, contact $q$, wire Q, back to zinc pole of battery B. Switch $b$ on being opened releases relay-armature $c$, thus breaking both circuits at contacts $p^3$ and $q$ at the same time and so replacing both circuits to their normal condition by the one operation.

Bell Z is of the ordinary kind, having its gong $s'$ and contact-pillar $s^3$ and hammer $s^2$ connected in multiple arc with wires P³ and R, so that if the bell Z is tampered with and hammer $s^2$ brought in contact with either its gong or contact-pillar $s^3$ bell Z', which is located in another part of the building, will ring. The hammer is normally out of contact with the contact $s^3$.

I claim—

1. In combination the two batteries A, B, the alarm, the contacts to be closed by the unauthorized person, the magnet and the armature thereof, the line-wire N extending from one pole of the battery to the magnets, the circuit-wires P', P extending from the magnets to the contacts and thence to the other pole of the battery, the contact $p^3$ and the wire leading therefrom to the battery A to maintain the circuit complete when the armature is attracted by the magnet upon the closing of the contacts, the circuit-wires leading from the battery B, said circuit including the contact $q$, the armature $c$ and the alarms, and a switch controlling the circuit of the battery A whereby both circuits may be broken at one operation by deënergizing the magnets, substantially as described.

2. In combination with the batteries A, B, the circuit of the battery A comprising the line P′, N, P³ and P, the magnets in said circuit, the armature, the contact $p^3$ with the wire P² leading therefrom to the battery A to maintain the energy of the magnet, the bell Z having its hammer arranged to act as a circuit-closer when the same is tampered with whereby the magnets will be energized, a circuit leading from the battery B including the armature and the contact $q$, the bell Z′, and the switch $b$ for deënergizing the magnets, substantially as described.

MARTIN PHILLIP McDERMOTT.

Witnesses:
THOMAS BUDDLE,
WM. D. BUDDLE.